United States Patent Office 3,102,019
Patented Aug. 27, 1963

3,102,019
METHOD FOR INHIBITING GERMINATION AND PREEMERGENT GROWTH OF PLANTS USING S(N-ARYL, N-ALIPHATIC CARBAMOYLMETH-YL) PHOSPHOROTHIATE TRIESTERS
Angelo John Speziale, Creve Coeur, and John P. Chupp, Kirkwood, Mo., assignors to Monsanto Chemical Company, St. Louis, Mo., a corporation of Delaware
No Drawing. Filed Aug. 16, 1961, Ser. No. 131,724
7 Claims. (Cl. 71—2.6)

This invention relates to useful esters of phosphorus and to methods of making same. This invention also relates to methods of selectively inhibiting the germination and preemergent growth of plants, particularly grasses, in contact with soil employing as an active agent therefor an ester of phosphorus of the formula

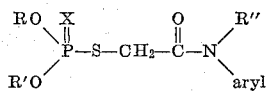

wherein R and R' respectively contain from 1 to 4 carbon atoms and are like or unlike alkyl or alkoxyalkyl radicals (e.g. methyl, ethyl, propyl, butyl, methoxyethyl, ethoxyethyl, methoxypropyl, and the various isomeric forms thereof) but usually like or unlike alkyl radicals, wherein X is a chalkogen of atomic weight less than 40 (i.e. sulfur or oxygen but preferably sulfur), wherein R" is an aliphatic hydrocarbon radical containing from 1 to 3 carbon atoms (e.g. methyl, ethyl, propyl, isopropyl, allyl, propenyl, propargyl), and wherein "aryl" means an aromatic hydrocarbon radical containing from 6 to 12 carbon atoms but usually from 6 to 8 carbon atoms (e.g. phenyl, tolyl, ethylphenyl, xylyl, cumenyl, cymenyl, butylphenyl, hexylphenyl, biphenyl, indenyl, naphthyl, etc., and the various isomeric forms thereof). Of these S-(N-aryl-N-aliphatic hydrocarbyl carbamoylmethyl) phosphorothioates the preferred for control of grasses are those of the formula

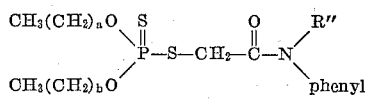

wherein $a$ and $b$ are like or unlike cardinal numbers from 0 to 1 and wherein R" is a linear (i.e. straight chain) aliphatic hydrocarbon radical containing 1 to 3 carbon atoms, but preferably a linear alkyl such as methyl, ethyl and n-propyl.

The method of providing these esters of phosphorus comprises reacting a salt (i.e. ammonium or alkali metal such as sodium, potassium or lithium) or mixture of salts of a phosphorothioic acid of the formula

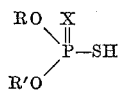

wherein R, R' and X have the aforedescribed significance with an alphahalo acetamide or mixture of alphahalo acetamides of the formula

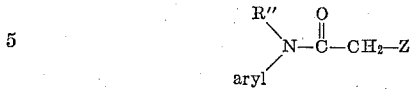

wherein R" and "aryl" have the aforedescribed significance and wherein Z is a halogen having an atomic number in the range of 16 to 36 (i.e. chlorine or bromine but preferably chlorine). When desired an inert organic liquid or solvent (e.g. acetone, butanone, dioxane, benzene, toluene, xylene, etc.) can be used. While a wide range of reaction temperatures can be used provided the system is fluid (i.e. a temperature above the freezing point of the system up to and including the system's boiling point) it is preferred to employ a reaction temperature in the range of from about 20° C. to about 120° C. Ordinarily but not necessarily the alphahalo acetamide and phosphorothioic acid salt reactants will be employed in substantially equimolecular proportions.

As illustrative of the phosphorothioates of this invention are
S-(N-phenyl-N-methylcarbamoylmethyl) O,O-dimethyl phosphorothioate
S-(N-phenyl-N-methylcarbamoylmethyl) O,O-dimethyl phosphorodithioate
S-(N-phenyl-N-methylcarbamoylmethyl) O,O-diethyl phosphorothioate
S-(N-phenyl-N-methylcarbamoylmethyl) O,O-diethyl phosphorodithioate
S-(N-phenyl-N-ethylcarbamoylmethyl) O,O-dimethyl phosphorothioate
S-(N-phenyl-N-ethylcarbamoylmethyl) O,O-dimethyl phosphorodithioate
S-(N-phenyl-N-ethylcarbamoylmethyl) O,O-diethyl phosphorothioate
S-(N-phenyl-N-ethylcarbamoylmethyl) O,O-diethyl phosphorodithioate
S-(N-phenyl-N-n-propylcarbamoylmethyl) O,O-diethyl phosphorodithioate
S-(N-phenyl-N-allylcarbamoylmethyl) O,O-diethyl phosphorodithioate
S-(N-phenyl-N-propargylcarbamoylmethyl) O,O-diethyl phosphorodithioate
S-(N-2-tolyl-N-ethylcarbamoylmethyl) O,O-dimethyl phosphorodithioate
S-(N-4-tolyl-N-methylcarbamoylmethyl) O,O-diethyl phosphorodithioate
S-(N-2,6-xylyl-N-ethylcarbamoylmethyl) O,O-diethyl phosphorodithioate
S-(N-phenyl-N-ethylcarbamoylmethyl) O,O-diisopropyl phosphorodithioate
S-(N-phenyl-N-methylcarbamoylmethyl) O,O-di-n-butyl phosphorodithioate
S-(N-2-naphthyl-N-methylcarbamoylmethyl) O,O-diethyl phosphorodithioate
S-[N-(4-biphenylyl)-N-methylcarbamoylmethyl]O,O-diethyl phosphorodithioate
S-[N-(4-ethylphenyl)-N-ethylcarbamoylmethyl]O,O-diethyl phosphorodithioate
S-[N-(3-isobutylphenyl)-N-ethylcarbamoylmethyl]O,O-diethyl phosphorodithioate S-(N-phenyl-N-ethylcarbamoylmethyl) O,O-di(2-ethoxyethyl)phosphorodithioate S-(N-phenyl-N-ethylcarbamoylmethyl) O,O-di(2-methoxyethyl) phosphorodithioate S-(N-phenyl-N-ethylcarbamoylmethyl) O,O-di(3-methoxypropyl) phosphorodithioate As illustrative of the methods for making the esters of phosphorus, but not limitative thereof, is the following:

EXAMPLE I

To a suitable reaction vessel equipped with a thermometer, agitator and reflux condenser is charged 4.86 parts by weight (substantially 0.024 mol.) of ammonium O,O-diethyl phosphorodithioate, 3.9 parts by weight (substantially 0.02 mol.) of alphachloro N-phenyl-N-ethylacetamide, and approximately 80 parts by weight of acetone. The mass is heated to the flux temperature and refluxed for 6 hours. The mass is then cooled to room temperature, filtered, and the filtrate stripped of acetone under vacuum. The residue is taken up with methylene chloride and the solution washed first with aqueous sodium carbonate and then with water. The so-washed organic solution is then stripped of volatiles under vacuum. The residue, a water-insoluble amber oil, is S-(N-phenyl-N-ethylcarbamoylmethyl) O,O-diethyl phosphorodithioate.

*Analysis.*—Theory: 8.95% P. Found: 8.8% P.

EXAMPLE II

Employing the procedure of Example I but replacing alphachloro N-phenyl-N-ethylacetamide with an equimolecular amount of alphachloro N-phenyl-N-methylacetamide there is obtained as a water-insoluble amber oil S-(N-phenyl-N-methylcarbamoylmethyl) O,O-diethyl phosphorodithioate.

EXAMPLE III

Employing the procedure of Example I but replacing alphachloro N-phenyl-N-ethylacetamide with an equimolecular amount of alphachloro N-phenyl-N-isopropylacetamide there is obtained as a water-insoluble amber oil S-(N-phenyl-N-isopropylcarbamoylmethyl) O,O - diethyl phosphorodithioate.

EXAMPLE IV

Employing the procedure of Example I but replacing alphachloro N-phenyl-N-ethylacetamide with an equimolecular amount of alphabromo N-phenyl-N-allylacetamide there is obtained S-(N-phenyl-N-allylcarbamoylmethyl) O,O-diethyl phosphorodithioate which is insoluble in water but soluble in acetone.

EXAMPLE V

Employing the procedure of Example I but replacing ammonium O,O-diethyl phosphorodithioate with an equimolecular amount of ammonium O,O-diethyl phosphorothioate there is obtained S-(N-phenyl-N-ethylcarbamoylmethyl) O,O-diethyl phosphorothioate which is soluble in acetone but insoluble in water.

EXAMPLE VI

Employing the procedure of Example I but replacing alphachloro N-phenyl-N-ethylacetamide with an equimolecular amount of alphachloro N-(2-methylphenyl)-N-methylacetamide there is obtained as a water-insoluble white solid S-[N-(2-methylphenyl)-N-methylcarbamoylmethyl] O,O-diethyl phosphorodithioate (M.P. 61.1–61.6° C.).

EXAMPLE VII

Employing the procedure of Example I but replacing alphachloro N-phenyl-N-ethylacetamide with an equimolecular amount of alphabromo N-(2-methyl-6-t-butylphenyl)-N-methylacetamide there is obtained S-[N-(2-methyl - 6 - t - butylphenyl) - N - methylcarbamoylmethyl] O,O-diethyl phosphorodithioate which is a white solid (M.P. 104–106° C.) insoluble in water but soluble in acetone.

EXAMPLE VIII

Employing the procedure of Example I but replacing ammonium O,O-diethyl phosphorodithioate with an equimolecular amount of ammonium O,O-dimethyl phosphorodithioate there is obtained S-(N-phenyl-N-ethylcarbamoylmethyl) O,O-dimethyl phosphorodithioate which is amber oil soluble in acetone but insoluble in water.

EXAMPLE IX

Employing the procedure of Example I but replacing ammonium O,O-diethyl phosphorodithioate with an equimolecular amount of potassium O,O-di-n-propyl phosphorodithioate there is obtained S-(N-phenyl-N-ethylcarbamoylmethyl) O,O-di-n-propyl phosphorodithioate, an amber oil which is water insoluble.

EXAMPLE X

Employing the procedure of Example I but replacing ammonium O,O-diethyl phosphorodithioate with an equimolecular amount of potassium O,O-diethyl phosphorothioate there is obtained S-(N-phenyl-N-ethylcarbamoylmethyl) O,O-diethyl phosphorothioate which is an amber oil insoluble in water but soluble in acetone.

EXAMPLE XI

Employing the procedure of Example I but replacing alphachloro N-phenyl-N-ethylacetamide with an equimolecular amount of alphachloro N-(2-naphthyl)-N-n-propylacetamide there is obtained S-[N-(2-naphthyl)-N-n-propylcarbamoylmethyl] O,O-diethyl phosphorodithioate which is insoluble in water but soluble in acetone.

EXAMPLE XII

Employing the procedure of Example I but replacing ammonium O,O-diethyl phosphorodithioate with an equimolecular amount of potassium O,O-dimethyl phosphorodithioate there is obtained S-(N-phenyl-N-ethylcarbamoylmethyl) O,O-dimethyl phosphorodithioate which is water-insoluble.

EXAMPLE XIII

Employing the procedure of Example I but replacing ammonium O,O-diethyl phosphorodithioate with an equimolecular amount of potassium O,O-di(2-methoxyethyl) phosphorodithioate there is obtained S-(N-phenyl-N-ethylcarbamoylmethyl) O,O - di(methoxyethyl) phosphorodithioate which is insoluble in water but soluble in acetone.

EXAMPLE XIV

Employing the procedure of Example I but replacing alphachloro N-phenyl-N-ethylacetamide with an equimolecular amount of alphachloro N-phenyl-N-n-propylacetamide there is obtained S-(N-phenyl-N-n-propylcarbamoylmethyl) O,O-diethyl phosphorodithioate which is insoluble in water but soluble in acetone.

EXAMPLE XV

Employing the procedure of Example I but replacing alphachloro N-phenyl-N-ethylacetamide with an equimolecular amount of alphabromo N-phenyl-N-propargylacetamide there is obtained S-(N-phenyl-N-propargylcarbamoylmethyl) O,O-diethyl phosphorodithioate which is insoluble in water.

In the process of this invention the methods by which the phosphorothioates of this invention are isolated will vary slightly with the reactants employed and the product produced. Further purification by selective solvent extraction or by absorptive agents such as activated carbon or clays can precede the removal of the inorganic liquid (or solvent) when the latter is employed in the reaction system. Additionally an inert organic solvent can be added to the reaction product along with absorptive agents for purification purposes. However, the crude reaction product is generally satisfactory for herbicidal purposes without purification.

The phosphorothioates of this invention are useful for inhibiting the germination and preemergent growth of plants from seeds in contact with soil.

The phosphorodithioates, especially the aforementioned preferred members of the class, are particularly useful for selectively inhibiting the germination and preemergent growth of grasses from seed in contact with soil, and to illustrate same particularly with respect to known analogues thereof is the following:

Seeds of several different plants (itemized hereinafter) each representing a principal botanical species are planted in aluminum pans (9½" x 5¼" x 2¾"). A good grade of top soil treated with 0.05% of a resinous polyelectrolyte soil conditioner is compacted to a depth of ⅜" from the top of the pan. The grass seeds are scattered randomly over one-half of the soil surface and the broadleaf seeds are scattered randomly over the remaining one-half of the soil surface. The seeds are then covered with ⅜" of the aforementioned treated top soil mixture and the pan levelled.

The levelled surface of the soil in the pan is then sprayed with 15 cc. of acetone containing the compound to be evaluated dissolved therein, the various rates in pounds of the compound applied per acre are set forth in Table I.

After spraying the soil surface the pan is placed in a sand bench and ½" of water added to the bench. The respect to its herbicidal effect on each plant is indicated by a number as follows:

0 _____ No germination inhibition.
1 _____ Slight germination inhibition.
2 _____ Moderate germination inhibition.
3 _____ Severe germination inhibition.

In the following tables of herbicidal evaluation the respective compounds evaluated are

| Compound (code letter) | Name of Compound |
|---|---|
| A | S-(N-phenyl-N-methylcarbamoylmethyl) O,O-diethyl phosphorodithioate. |
| B | S-(N-phenyl-N-ethylcarbamoylmethyl) O,O-diethyl phosphorodithioate. |
| C | S-(N-phenyl-N-isopropylcarbamoylmethyl) O,O-diethyl phosphorodithioate. |
| D | S-[N-(2-methylphenyl)-N-methylcarbamoylmethyl]O,O-diethyl phosphorodithioate. |
| E | S-(N-phenyl-N-methylcarbamoylmethyl) O,O-dimethyl phosphorodithioate. |
| F | S-(N-phenyl-N-methylcarbamoylmethyl) O,O-di-n-propyl phosphorodithioate. |
| G | S-[N-(2-methyl-6-t-butylphenyl)-N-methylcarbamoylmethyl] O,O-diethyl phosphorodithioate. |
| H | S-(N-phenyl-N-methylcarbamoylmethyl) O,O-diethyl phosphorothioate. |
| I* | S-(carbamoylmethyl) O,O-diethyl phosphorodithioate. |
| J* | S-(N-phenylcarbamoylmethyl) O,O-diethyl phosphorodithioate. |
| K* | S-[N-(hydroxymethyl)-carbamoylmethyl] O,O-diethyl phosphorodithioate. |

*These components are disclosed in United States Patent No. 2,494,283.

*Table 1*

EXTENT[1] OF PHYTOTOXICITY EMPLOYING COMPOUND

| Compound | A | B | C | D | E | F | G | H | I | J | K | E | F | H | J |
|---|---|---|---|---|---|---|---|---|---|---|---|---|---|---|---|
| Lbs. Per Acre | 3 | 3 | 3 | 5 | 5 | 5 | 5 | 5 | 5 | 5 | 5 | 25 | 25 | 25 | 25 |
| Plant: | | | | | | | | | | | | | | | |
| Morning Glory | 2 | 2 | 0 | 0 | 2 | 0 | 0 | 2 | 0 | 0 | 0 | 2 | 1 | 3 | 0 |
| Wild Oat | 3 | 2 | 3 | 3 | 3 | 2 | 1 | 3 | 0 | 0 | 0 | 3 | 3 | 3 | 0 |
| Brome Grass | 1 | 1 | 2 | 1 | 1 | 0 | 1 | 0 | 0 | 0 | 0 | 2 | 0 | 1 | 0 |
| Rye Grass | 3 | 2 | 3 | 3 | 3 | 2 | 1 | 3 | 0 | 0 | 0 | 3 | 3 | 3 | 0 |
| Radish | 0 | 0 | 0 | 0 | 1 | 0 | 0 | 1 | 0 | 0 | 0 | 2 | 2 | 2 | 0 |
| Sugar Beet | 1 | ---- | 0 | 0 | 2 | 1 | 0 | 3 | 0 | 0 | 0 | 2 | 2 | 3 | 0 |
| Foxtail | 3 | 3 | 3 | 3 | 3 | 3 | 2 | 3 | 0 | 0 | 0 | 3 | 3 | 3 | 0 |
| Crab Grass | 3 | 3 | 3 | 3 | 3 | 3 | 3 | 3 | 0 | 0 | 0 | 3 | 3 | 3 | 0 |
| Pigweed | 3 | 1 | 3 | 3 | 3 | 3 | 1 | 3 | 0 | 0 | 0 | 3 | 3 | 3 | 0 |
| Soybean | 0 | 0 | 0 | 0 | 2 | 1 | 0 | 2 | 0 | 0 | 0 | 2 | 1 | 2 | 0 |
| Wild Buckwheat | 0 | 2 | 1 | 0 | 0 | 0 | 0 | 1 | 0 | 0 | 0 | 2 | 1 | 2 | 0 |
| Tomato | 0 | 0 | 0 | 0 | 1 | 0 | 0 | 1 | 0 | 0 | 0 | 2 | 0 | 3 | 0 |
| Sorghum | 3 | 2 | 3 | 3 | 2 | 3 | 1 | 3 | 0 | 0 | 0 | 3 | ---- | 3 | 0 |

[1] 3—severe phytotoxicity; 2—moderate phytotoxicity; 1—slight phytotoxicity; 0—No phytotoxicity.

soil absorbs moisture through perforations in the bottom until the soil surface is about one-half moist, by which time the excess water in the sand bench is drained off. The remaining soil surface is moistened by capillary action.

Fourteen days after application of the compound the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale used is as follows:

HERBICIDAL RATING-CONVERSION SCALE

| Seed Lot, Percent Germination (Control) | 3 | 2 | 1 | 0 |
|---|---|---|---|---|
| | (Number of plants surviving) | | | |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative value of the compound evaluated with

To further illustrate the activity of the phosphorothioates of this invention is the following:

Seeds of several different plants (itemized hereinafter) each representing a principal botanical species are planted in aluminum pans (9½" x 5¼" x 2¾"). A good grade of top soil which has been treated with 0.05% of a resinous polyelectrolyte soil conditioner is compacted to a depth of ⅜" from the top of the pan. The grass seeds are scattered randomly over one-half of the soil surface and the broadleaf seeds are scattered randomly over the remaining one-half of the soil surface. The seeds are then covered with 450 grams of the aforedescribed treated top soil in intimate mixture with the phosphorothioate to be evaluated and the pan levelled. The amount of phosphorothioate so added is set forth in Table II in pounds per acre.

After levelling the soil surface, the pan is placed in a sand bench and ½" of water added to the bench. The soil absorbs moisture through perforations in the bottom until the soil surface is about one-half moist, by which time the excess water in the sand bench is drained off. The remaining soil surface is moistened by capillary action.

Fourteen days after application of the phosphorothioate the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale used is as follows:

HERBICIDAL RATING-CONVERSION SCALE

| Seed Lot, Percent Germination (Control) | 3 | 2 | 1 | 0 |
|---|---|---|---|---|
| | (Number of plants surviving) | | | |
| 100 | 0-5 | 6-10 | 11-15 | 16-20 |
| 90 | 0-5 | 6-9 | 10-13 | 14-20 |
| 80 | 0-4 | 5-8 | 9-12 | 13-20 |
| 70 | 0-4 | 5-7 | 8-11 | 12-20 |
| 60 | 0-3 | 4-6 | 7-9 | 10-20 |
| 50 | 0-3 | 4-5 | 6-8 | 9-20 |
| 40 | 0-2 | 3-4 | 5-6 | 7-20 |

The relative value of the phosphorothioate with respect to its herbicidal effect on each plant is indicated by a number as follows:

0 ------------------ No germination inhibition.
1 ------------------ Slight germination inhibition.
2 ------------------ Moderate germination inhibition.
3 ------------------ Severe germination inhibition.

In the following table of herbicidal evaluation the phosphorothioates have the same code letter significance as set forth hereinbefore.

It will be apparent that quite different effects can be obtained by modifying the method of use. For this reason an essential part of this invention is the formulation so as to permit a uniform predetermined application of herbicide to soil or other growth media so as to produce the desired effect. By proper selection and proportioning of the various conditioning agents either liquid or solid formulations can be prepared, and so as to adapt the herbicide for achieving the desired result with any conventional device for treating the surface or sub-surface of the soil or other growth media.

Although the phosphorothioates of this invention are useful per se in controlling a wide variety of plant growth, it is preferable that they be supplied to the plant growing medium in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further that the particles may be colloidal in size and distributed throughout a liquid phase in the form of suspensions or emulsions or in the form of particles held in suspension by wetting agent. The term "dispersed" also means that the particles may be mixed with and distributed throughout a solid

*Table II*

EXTENT [1] OF PHYTOTOXICITY EMPLOYING COMPOUND

| Compound | A | B | C | A | B | C | D | E | F | H | F | H | A | B | C |
|---|---|---|---|---|---|---|---|---|---|---|---|---|---|---|---|
| Lbs. Per Acre | 5 | 5 | 5 | 1 | 1 | 1 | 1 | 1 | 1 | 1 | 0.5 | 0.5 | 0.4 | 0.4 | 0.4 |
| Plant: | | | | | | | | | | | | | | | |
| Morning Glory | 3 | 3 | 0 | 0 | 0 | 0 | 0 | 0 | 0 | 0 | 0 | 0 | 0 | 0 | 0 |
| Wild Oat | 3 | ---- | 3 | 0 | 0 | 3 | 0 | 0 | 2 | 2 | 1 | 0 | ---- | 0 | 0 |
| Brome Grass | 3 | 3 | 3 | 3 | 3 | 2 | 0 | 0 | 1 | 0 | 0 | 1 | 0 | 2 | 2 |
| Rye Grass | 3 | 3 | 3 | ---- | 3 | 3 | 1 | 2 | 3 | 2 | 1 | 0 | 3 | 3 | 3 |
| Radish | 2 | 0 | 0 | 0 | 0 | 0 | 0 | 0 | 0 | 0 | 0 | 2 | 0 | ---- | 0 |
| Sugar Beet | 3 | 3 | 3 | 0 | 0 | 3 | 0 | 0 | 1 | 0 | 0 | 0 | 0 | 0 | 0 |
| Foxtail | 3 | ---- | 3 | 3 | 3 | 3 | 3 | 3 | 3 | 3 | 3 | 3 | 3 | 3 | 3 |
| Crab Grass | 3 | 3 | 3 | 3 | 3 | 3 | 3 | 3 | 3 | 3 | 3 | 3 | 3 | 3 | 3 |
| Pigweed | 3 | ---- | 3 | 3 | 0 | 1 | 0 | 1 | 2 | 2 | 1 | 1 | 1 | 0 | 0 |
| Soybean | 1 | 0 | 1 | 0 | 0 | 0 | 0 | 0 | 0 | 0 | 0 | 0 | ---- | 0 | 0 |
| Wild Buckwheat | 1 | 3 | 0 | 0 | 0 | 0 | 0 | 0 | 0 | 0 | 0 | 0 | 0 | 0 | 0 |
| Tomato | 0 | ---- | 0 | 0 | 0 | 0 | 0 | 0 | 1 | 0 | 0 | 0 | 0 | 0 | 0 |
| Sorghum | 3 | 3 | 3 | 3 | 3 | 3 | 3 | 2 | 3 | 2 | 2 | 2 | 2 | 2 | 2 |

[1] 3—severe phytotoxicity; 2—moderate phytotoxicity; 1—slight phytotoxicity; 0—no phytotoxicity.

From the foregoing evaluation data it is apparent that the phosphorothioates of this invention are effective pre-emergence herbicides. Valuable grass selective herbicidal effects will be observed by applications of small amounts, for example, as low as 0.1 lb. of the phosphorothioate per acre as well as higher concentrations, for example, up to 15 lbs. per acre. The preferred range of application for grass specificity is from about 0.5 to about 10 lbs. per acre. For general application and herbicidal effect on both grasses and dicotyledonous plants larger amounts, e.g., up to 30 lbs. per acre, will be found necessary.

Selective herbicidal activity with respect to several genera of grasses is illustrated by the data in the foregoing table. The botanical types, or genera, of grasses which are effectively controlled by means of the phosphorothioates of this invention, embrace a large number of undesirable plants, or weeds, frequently found in vegetable crops. This invention is not limited to removing grasses from broad leaf plants since the selective activity will be useful in removing weeds from corn, which belongs to a different genus of grass. Many other crops and particularly the broad leaved plants are inhibited by weeds of the crab grass and rye genera, which can be effectively controlled by the practice of this invention. In some instances there are minor herbicidal effects on dioctyledonous plants, and therefore optimum results may depend to some extent on experience with respect to the activity of the particular phosphorothioate on the vegetable crop to be treated.

carrier providing a mixture in particulate form, e.g., pellets, granules, powders, or dusts.

In the instant specification and appended claims it is to be understood that the expression "extending agent" includes any and all of those substances in which the phosphorothioates of this invention are dispersed. It includes, therefore, the solvents of a true solution, the liquid phase of suspensions, or emulsions and the solid phase of particulate solids, e.g., pellets, granules, dusts and powders.

The exact concentration of the phosphorothioates of this invention employed in combatting or controlling noxious vegetation can vary considerably provided the required dosage (i.e. herbicidal amount) thereof is supplied to the soil or other plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared herbicidal spray or particulate solid. In such a concentrate composition, the phosphorothioate generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the phosphorothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The phosphorothioates of this invention are preferably supplied to the plant growing medium in the form of emulsions or suspensions. Emulsions or suspensions are prepared by dispersing the phosphorothioate of this invention either per se or in the form of an organic solution thereof in water with the aid of a water-soluble surfactant. The term "surfactant" as employed here in the appended claims is used as in volume II of Schwartz, Perry and Berch's "Surface Active Agents and Detergents" (1958, Interscience Publishers, Inc., New York), in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition page 280). These surfactants include the well-known capillary active substances which may be anion-active (or anionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York), and also in the November 1947 issue of Chemical Industries (pages 811–824), in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The phosphorothioates of this invention can be dispersed by suitable methods (e.g. tumbling or grinding) in solid extending agents either of organic or inorganic nature and supplied to the plant growing medium in particulate form. Such solid materials include for example, tricalcium phosphate, calcium carbonate, kaoline, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. Attapulgus clay. These mixtures can be used for herbicidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of phosphorothioate of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of S-(N-phenyl-N-ethylcarbamoylmethyl) O,O-diethyl phosphorodithioate and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of a phosphorothioate of this invention in an organic solvent therefor. The said liquid concentrate preferably contains dissolved therein a minor amount (e.g. 0.5 to 10 percent by weight of the weight of the new herbicidal agent) of a surfactant (or emulsifying agent), which surfactant is also water-soluble. As illustrative of such a concentrate is a solution of S-(N-phenyl-N-ethylcarbamoylmethyl) O,O-diethyl phosphorodithioate in acetone which solution contains dissolved therein a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan monoester of alkylphenol.

In all of the various dispersions described hereinbefore for herbicidal purposes, the active ingredient can be one or more of the compounds of this invention. The compounds of this invention can also be advantageously employed in combination with other pesticides, including, for example, nematocides, bacterocides, and insecticides. In this manner it is possible to obtain mixtures which are effective against a wide variety of pests and other forms of noxious life.

When operating in accordance with the present invention growth inhibiting amounts of the compound or a composition containing same are dispersed or distributed in any convenient fashion in soil or other growth media, for example by simple mixing with the soil, or by applying to the surface of the soil and thereafter dragging or disking the soil to the desired depth, or by injection or drilling techniques whereby the phosphorothioate of this invention is deposited beneath the surface of the soil, or by employment of a liquid carrier (solvent or non-solvent) to accomplish the penetration and impregnation. The application of the spray and dust compositions to the surface of the soil may be accomplished by conventional methods, e.g. with power dusters, broom or hand sprayers or spray dusters.

While this invention has been described with respect to certain embodiments, it is to be understood that it is not so limited and that variations and modifications thereof obvious to those skilled in the art can be made without departing from the spirit and scope thereof.

This application is a continuation-in-part of application Serial No. 78,224, filed December 27, 1960, now abandoned.

What is claimed is:

1. The method of inhibiting the germination and preemergent growth of plants which comprises treating the plant growing medium with at least one phosphorothioate of the formula

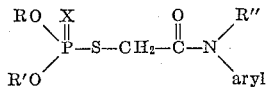

wherein R and R' contain from 1 to 4 carbon atoms and are selected from the group consisting of alkyl and alkoxyalkyl radicals, wherein X is a chalkogen of atomic weight less than 40, wherein R'' is an aliphatic hydrocarbon radical containing 1 to 3 carbon atoms, and wherein "aryl" means an aromatic hydrocarbon radical containing from 6 to 12 carbon atoms.

2. The method of inhibiting the germination and pre-emergent growth of grasses which comprises treating the plant growing medium with at least one phosphorodithioate of the formula

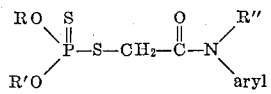

wherein R and R' are alkyl radicals containing 1 to 4 carbon atoms, wherein R'' is a linear aliphatic hydrocarbon radical containing from 1 to 3 carbon atoms, and wherein "aryl" means an aromatic hydrocarbon radical containing 6 to 8 carbon atoms.

3. The method of selectively inhibiting the germination of grass seeds in contact with soil and the preemergent growth thereof which comprises treating said soil with from about 0.5 to about 10 pounds per acre of a phosphorodithioate of the formula

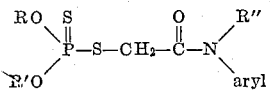

wherein R and R' are alkyl radicals containing 1 to 4 carbon atoms, wherein R'' is a linear aliphatic hydrocarbon radical containing from 1 to 3 carbon atoms, and wherein "aryl" means an aromatic hydrocarbon radical containing 6 to 8 carbon atoms.

4. The method of claim 1 wherein the phosphorothioate is employed at a rate in the range of 0.1 to 30 pounds per acre.

5. The method of selectively inhibiting the germination of grass seeds in contact with soil and the preemergent growth thereof which comprises incorporating in the said soil from about 0.5 to about 10 pounds per acre of a phosphorodithioate of the formula

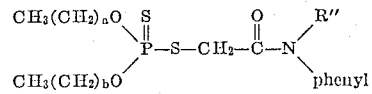

wherein $a$ and $b$ are cardinal numbers from 0 to 1, and wherein R'' is a linear alkyl radical containing from 1 to 3 carbon atoms.

6. The method of selectively inhibiting the germination of grass seeds in contact with soil and the preemergent growth thereof which comprises incorporating in the said soil from about 0.5 to about 10 pounds per acre of S-(N-phenyl-N-ethylcarbamoylmethyl) O,O - diethyl phosphorodithioate.

7. The method of selectively inhibiting the germination of grass seeds in contact with soil and the preemergent growth thereof which comprises incorporating in the said soil from about 0.5 to about 10 pounds per acre of S-(N-phenyl-N-methylcarbamoylmethyl) O,O-diethyl phosphorodithioate.

References Cited in the file of this patent

UNITED STATES PATENTS

| | | |
|---|---|---|
| 2,494,283 | Cassaday et al. | Jan. 10, 1950 |
| 2,959,610 | Young et al. | Nov. 8, 1960 |
| 3,032,466 | Schuler | May 1, 1962 |

FOREIGN PATENTS

| | | |
|---|---|---|
| 791,824 | Great Britain | Mar. 12, 1958 |
| 517,089 | Canada | Oct. 4, 1955 |

OTHER REFERENCES

Mandelbaum et al.: "Zhur. Obshchei Khim.," vol. 29, pages 283–285 (1959).

Hewitt et al.: "J. Econ. Entomol.," vol. 51, pages 126–131 (April 1958). (Copy in Scientific Library.)